April 14, 1970   J. J. BRESLIN   3,505,791
VACUUM CLEANER FILTER CONDITION SENSING SYSTEM
Filed July 1, 1968

INVENTOR.
JOHN J. BRESLIN
BY Naylor & Neal
ATTORNEYS

United States Patent Office 3,505,791
Patented Apr. 14, 1970

3,505,791
VACUUM CLEANER FILTER CONDITION SENSING SYSTEM
John J. Breslin, Los Altos Hills, Calif., assignor to Beamco, Inc., Mountain View, Calif., a corporation of California
Filed July 1, 1968, Ser. No. 741,789
Int. Cl. B01d 46/00
U.S. Cl. 55—274                                 5 Claims

ABSTRACT OF THE DISCLOSURE

A system for use with a vacuum cleaner having a vacuum tank divided into a vacuum source section and a collection section by a fluid pervious filter. The system is designed to sense when the filter becomes overladen and comprises a pressure differential switch coupled between the vacuum source section and a vacuum inlet conduit section; an electrcal circuit connected across the switch for completion therethrough; and, a signal light or other signaling device coupled to the circuit for activation therethrough. The switch incorporated into the system is provided with a T-fitting for direct interposition in the vacuum inlet conduit and includes a housing section fabricated of electrically non-conductive material having the switch contacts mounted directly therein.

---

Figure 1:
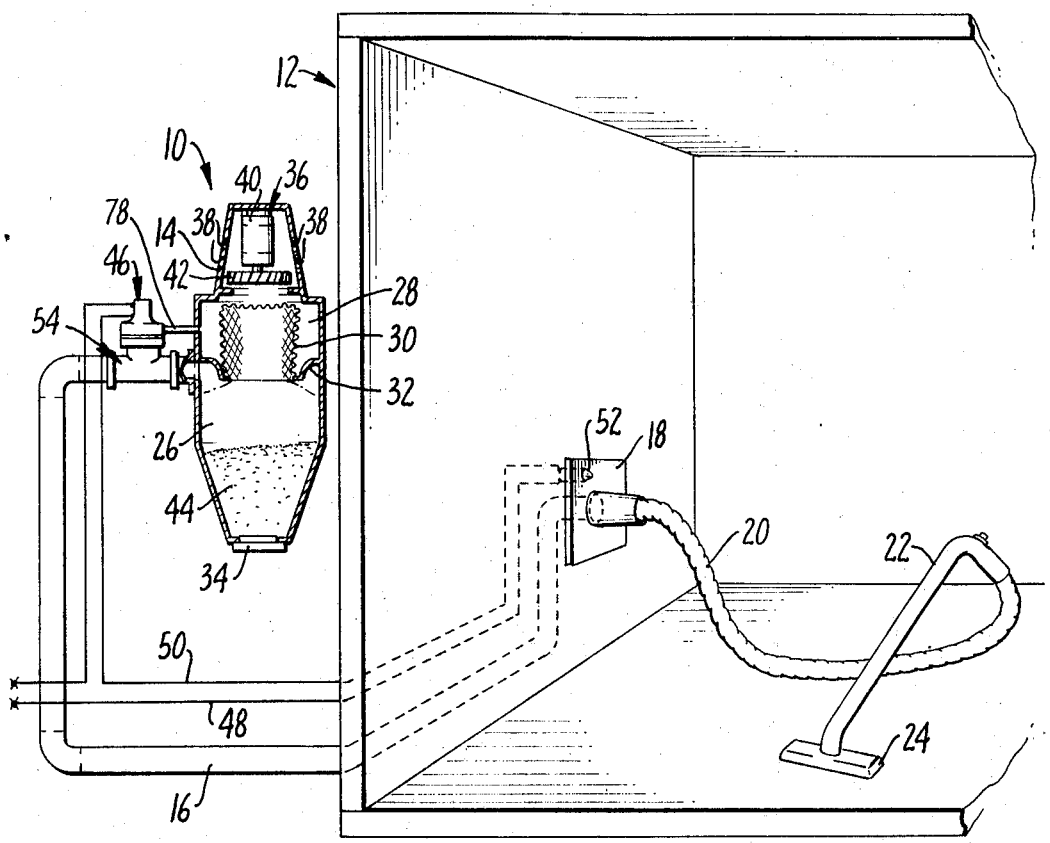

The present invention relates to the art of central vacuum cleaner systems and is particularly concerned with a monitoring arrangement to sense when the filter employed in such systems becomes overladen.

In the prior art, central vacuum cleaner systems are well known and date back to the eighteen hundreds. These systems typically employ a centrally disposed vacuum and dirt collection tank having vacuum conduits extending therefrom to remote locations for cleaning at those locations. Most usually, the tank is divided into a vacuum source section and a dirt collection section by a pervious filter extending thereacross. The conduits are connected to the dirt collection section and a blower is generally disposed in the vacuum source section to create a low pressure area therein. In use, dirt is collected in the collection section and also accumulates on the filter. The accumulation of dirt on the filter decreases its fluid permeability and, eventually, adversely affects the operation of the system.

One of the adverse effects resulting from overladening of the filter is that it decreases the flow velocity of air through the system and increases the risk of stoppages in the vacuum conduits. Another adverse effect is that system efficiency declines. Where the filter is of the bag type, yet another adverse effect is that it may collapse towards and be drawn into the blower. On such occurrence, serious damage to the blower is almost inevitable.

The problem of overladening of the filter in a central vacuum cleaner system is particularly acute because the vacuum tank is remote from the operator. Thus, the operator is generally oblivious to the condition of the filter. Frequently, operators do not even realize that the system employs a filter.

While efforts have been made to provide vacuum cleaners with overload warning devices, these have not been well suited for central vacuum cleaning systems. The most common of these efforts are found in the portable vacuum cleaner art wherein the filter comprises a pervious collection bag disposed downstream of the blower. With such arrangements, the prior art suggests monitoring the back pressure imposed by the filter to sense its condition. Prior art efforts have also suggested monitoring the temperature of the blower motor to sense the condition of the filter. Although the latter type of monitoring might be used in a central vacuum cleaner system, it is of doubtful value because it is not truly responsive to filter conditions.

The present invention may be summarized as a filter monitoring arrangement for use in a central vacuum cleaner system employing a vacuum tank divided into a collection section and a vacuum source section by fluid pervious filter and a vacuum conduit leading from sealed communication with the collection section to a location remote therefrom. The arrangement comprises a pressure differential switch disposed in fluid communication with opposite sides of the filter to sense pressure differentials between the collection and vacuum source sections and effect the completion of an electrical circuit responsive to the sensing of a predetermined pressure differential; an electrical monitoring circuit connected across the switch for completion therethrough; and an electrical signaling means, such as a light, connected in said circuit for actuation therethrough.

The principal object of the invention is to provide a filter monitoring arrangement for a central vacuum cleaner system which is truly responsive to filter condition and relatively insensitive to momentary closure of the vacuum conduits employed in the system. With respect to this object, it is another and related object to provide such an arrangement which functions responsive to the pressure differential across the filter, rather than to the pressure to either side of the filter.

Still another object of the invention is to provide an improved pressure differential switch of simplified construction ideally suited for incorporation into a central vacuum cleaner system.

Figure 2:
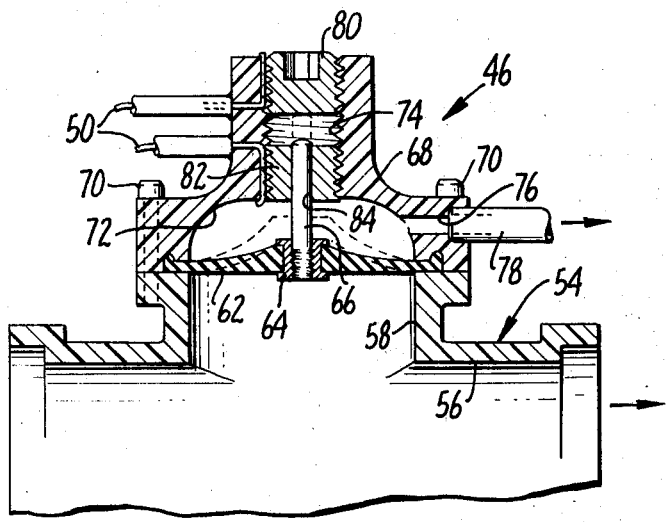

These and other objects and the detailed construction and operation of the invention will become more apparent when viewed in light of the following detailed description and accompanying drawings wherein:

FIG. 1 is a perspective view diagrammatically illustrating the monitoring arrangement of the present invention incorporated into a central vacuum system; and FIG. 2 is a sectional view, in elevation, illustrating the pressure differential switch of the invention.

Referring now to FIG. 1, the central vacuum system is designated therein in its entirety by the numeral 10 and is shown disposed to one side of and extending into a room 12. The system comprises, as its permanently installed elements, a vacuum tank 14; a vacuum conduit 16 extending from fluid communication with the tank to the interior of the room 12; and a wall inlet 18 mounted interiorly of the room 12 at the distal end of the conduit 16. As illustrated, the system also includes movable elements comprising a flexible conduit 20 removably secured to the inlet in fluid communication with the conduit 16; a rigid conduit arm 22 secured in fluid communication with the distal end of the conduit 20; and, a nozzle 24 mounted on the arm 22. While not illustrated, it is to be understood that the system may also include electrical circuitry extending between the arm 22 and the tank 14 to provide for the remote operation of the tank. This circuitry might be of the type disclosed in my prior Patent No. 3,258,553.

The tank 14 is of relatively conventional construction and comprises a collection section 26; a vacuum source section 28; a fluid permeable filter 30 of bag-like construction mounted on a flange 32 in interposed relationship between the collection and vacuum source sections; and, a clean out plug 34 removably received in the lower end of the section 26. A vacuum blower 36 is mounted within the section 28 to provide for the creation of a vacuum therein and exhausts therethrough through ports 38. The blower 36 comprises an electric motor 40 having the output shaft thereof fixed to an impeller 42. For the sake of illustration, a sample of dirt, designated by the numeral 44, is shown accummulated in the lower end of the collection section 26. It is noted that the vacuum conduit 16 opens into the tank 14 beneath the barrier provided by the filter 30 in flange 32.

The basic elements of the inventive monitoring system comprise a pressure differential switch 46; an electrical circuit defined by leads 48 and 50; and, an electric signal light 52 connected across the leads at the wall inlet 18. The switch 46, as will become more apparent from the subsequent detailed description, is disposed in fluid communication with opposite sides of the filter 30 to sense pressure differentials there-across. The lead 50 is connected across switch 46 and defines, together with the lead 48, an electrical circuit leading to an external source of current (not illustrated).

The switch 46 comprises, as its basic element, a fitting 54 of relatively conventional T-shaped configuration made up of a main section 56 and a branch section 58, which sections define what hereinafter will be referred to as a first chamber. A flexible diaphragm 62 is sealingly disposed over the distal end of the branch section 58 and designed for translation relative thereto between a neutral position, as illustrated in solid lines, and an extended position as illustrated in phantom lines. The diaphragm 62 is fabricated of a flexible electrically non-conductive material, such as rubber, and is formed with an axially disposed internally threaded insert 64. The insert 64 threadedly receives an electrically conductive staff 66 which extends axially therefrom and away from the fitting 54.

A housing 68 fabricated of electrically non-conductive material is secured to the distal end of the branch section 68 by screw 70 and defines a second chamber, designated by the numeral 72, to the side of the diaphragm 62 opposite that facing the chamber defined by the sections 56 and 58. The housing 68 is formed with a threaded passage 74 extending therethrough and into communication with the chamber 72 in axial alignment with the staff 66. To accommodate the extension of electrical leads into the housing 68, apertures extend therethrough and into the passage 74. In FIG. 2, these apertures are shown receiving separated ends of the lead 50. The housing 68 is also formed with a passage 76 extending therethrough to establish fluid communication between the second chamber 72 and a source of pressure. In the system illustrated, such communication is established by conduit 78 extending in sealed fluid communication between the passage 76 and the interior of the vacuum source section 28.

The structure of the switch 46 is completed by a pair of electrical contacts 80 and 82 threadedly received in the passage 74 in opposed spaced apart relationship. These contacts are designed to make electrical connection with leads extending into the housing. In FIG. 2, such connections are shown between the ends of the lead 50 extending into the housing and the respective contacts. In assembly, the connections are established by first extending the ends of the leads into the housing, as shown in FIG. 2, and then threading the contacts 80 and 82 in place. Once threaded to the desired position, the contacts are held in place by frictional engagement with the threads of the passage 74 and the electrical leads received therein. The contact 80 is of solid construction and positioned so as to be spaced from the staff 66 when the diaphragm 62 is at the neutral position and contacted by the staff when the diaphragm is deflected to a predetermined degree, as illustrated by the phantom line representation in FIG. 2. The contact 82 is of tubular configuration and defines a passage 84 in axial alignment with the staff 66. The passage 84 is designed to maintain continuous contact with the staff 66 while permitting its substantially unrestricted axial movement relative thereto. Through this characteristic, the staff 66 establishes electrical connection between the contacts 80 and 82 whenever the diaphragm 62 is deflected to the phantom line position illustrated in FIG. 2. As noted in the foregoing discussion, this occurs whenever a predetermined pressure differential occurs between the first chamber defined by the sections 56 and 58 and the second chamber 72.

The T-shaped configuration of the fitting 54 facilitates direct interposition of the switch 46 in a fluid conduit. Such an arrangement is shown in FIG. 1 wherein the fitting is illustrated interposed in the conduit 16. As thus incorporated into the FIG. 1 system, the first chamber of the switch communicates with the collection section 26 through the conduit 16 and the second chamber of the switch communicates with the vacuum source section through the conduit 78.

In the use in a central vacuum cleaner system, as shown in FIG. 1, the monitoring system of the present invention continuously senses the condition of the filter 3. So long as the pressure differential across the filter is not excessive the circuit to the warning light 52 is incomplete. Upon the occurrence of an excessive pressure differential across the filter, however, the diaphragm 62 is deflected and the staff 66 is moved to connect the contacts 80 and 82 and complete the circuit therethrough. Completion of the circuit, in turn, activates the light 52 and warns the user that the filter should be replaced or cleaned. The operation of the monitoring system is particularly advantageous, since it is relatively insensitive to momentary closures of the vacuum system, as frequently occur in actual operation. This insensitive characteristic results because the monitoring system senses the pressure differential across the filter, rather than the pressure to only one side of it.

From the foregoing detailed description it is believed apparent that the present invention enables the accomplishment of the objects initially set forth herein. It should be understood, however, that the invention is not intended to be limited to the specifics herein illustrated and described, but rather is defined by the folowing claims.

I claim:
1. A pressure differential switch comprising:
    (a) a fitting defining a first chamber adapted to be coupled in sealed fluid communication with a fluid conduit;
    (b) a flexible diaphragm secured to said fitting in sealed relationship to said first chamber so as to have one side thereof exposed to said chamber, said diaphragm being adapted to translate responsive to the occurrence of differential pressure thereacross and having an electrically conductive staff secured thereto and extending laterally therefrom;
    (c) a housing secured to said fitting over said diaphragm, said housing having:
        (1) a second chamber defined therein and sealingly disposed over said diaphragm so as to be exposed to the side thereof opposite said first chamber;
        (2) a passage therein disposed in substantially axially aligned relationship to said staff; and,
        (3) conduit means communicating with said second chamber to provide for the communication of said chamber with a fluid pressure source;
    (d) a first electrical contact secured to said housing within said passage in slidable contact with said staff; and,
    (e) a second electrical contact secured to said housing within said passage in spaced electrically insulated relationship to said first contact, said second contact being in the axial path of said staff and positioned so as to be spaced therefrom when the diaphragm is in a neutral position and contacted thereby upon the deflection of the diaphragm responsive to a predetermined pressure differential thereacross.

2. A switch according to claim 1 wherein said first contact is of tubular configuration and said staff extends slidably therethrough.

3. A switch according to claim 1 wherein said housing is electrically non-conductive and further comprising first and second electrical leads extending into said passage in spaced relationship to each other and wherein said first and second contacts are held in place within said passage in contact, respectively, with said first and second leads by direct frictional engagement therewith and with the walls of said passage.

4. A switch according to claim 1 wherein:
(a) said fitting comprises a tubular body having a main section adapted to be interposed in a conduit and a branch section in fluid communication with and extending laterally from said main section;
(b) said housing is secured over the distal end of said branch section; and,
(c) said diaphragm extends over the distal end of said branch section in interposed relationship between said fitting and housing.

5. A central vacuum cleaner system comprising:
(A) a vacuum tank divided into a collection section and a vacuum source section by a fluid pervious filter; and,
(B) a vacuum conduit leading from sealed fluid communication with the collection section of said tank to a location remote therefrom; the improvement comprising:
(I) a pressure differential switch disposed in fluid communiction with opposite sides of said filter to sense pressure differentials between said collection and vacuum source sections and effect the completion of an electrical circuit responsive to the sensing of a predetermined pressure differential;
(a) said pressure differential switch comprising:
(1) a tubular fitting having a main section interposed in said conduit and a branch section extending laterally from said main section, said sections defining a first chamber in fluid communication with said conduit;
(2) a housing secured over the distal end of said branch section, said housing defining therein a second chamber;
(3) a flexible diaphragm extending over the distal end of said branch section in sealed interposed relationship between said first and second chambers, said diaphragm being adapted to translate responsive to the occurrence of differential pressure thereacross and having an electrically conductive staff secured thereto and extending generally axially therefrom;
(4) a first electrical contact mounted within said housing in slidable contact with said staff;
(5) a second electrical contact mounted within said housing in spaced electrically insulated relationship to said first contact, said second contact being in the axial path of said staff and positioned so as to be spaced therefrom when the diaphragm is in a neutral position and contacted thereby upon the deflection of the diaphragm responsive to a predetermined pressure differential thereacross;
(b) said pressure differential switch being disposed in fluid communication with opposite sides of said filter by the interposition of said main section in said conduit and a connection establishing fluid communication between said second chamber and the vacuum section of said tank;
(II) an electrical monitoring circuit connected across said switch by connection with said contacts for completion therethrough upon the sensing of a predetermined pressure differential thereby; and
(III) electrical signaling means connected in said circuit for actuation therethrough.

References Cited

UNITED STATES PATENTS

| | | | |
|---|---|---|---|
| 1,106,231 | 8/1914 | Marshall | 15—314 |
| 1,979,873 | 11/1934 | Engstrom | 55—334 |
| 2,230,113 | 1/1941 | Hein | 200—83 |
| 2,468,768 | 5/1949 | Malick | 200—81.9 |
| 2,927,659 | 3/1960 | Babst et al. | 55—274 X |
| 3,023,447 | 3/1962 | Senne | 55—378 |
| 3,118,986 | 1/1964 | Lewis et al. | 200—82 |

FOREIGN PATENTS 15,695  1910  Great Britain.

DENNIS E. TALBERT, JR., Primary Examiner

U.S. Cl. X.R.

15—314; 55—319, 361, 433; 200—83